(12) United States Patent
Nakano et al.

(10) Patent No.: US 7,135,222 B2
(45) Date of Patent: Nov. 14, 2006

(54) RADIOGRAPHIC IMAGE CONVERSION PANEL

(75) Inventors: Kuniaki Nakano, Hino (JP); Katsuya Kishinami, Hino (JP); Akihiro Maezawa, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 340 days.

(21) Appl. No.: 10/740,224

(22) Filed: Dec. 18, 2003

(65) Prior Publication Data

US 2004/0146703 A1    Jul. 29, 2004

(30) Foreign Application Priority Data

Dec. 27, 2002   (JP)   .............................. 2002-381389
Dec. 27, 2002   (JP)   .............................. 2002-381555

(51) Int. Cl.
  *G01T 1/58*   (2006.01)
  *D04H 1/00*   (2006.01)
  *G01N 21/64*  (2006.01)

(52) U.S. Cl. ................. 428/292.1; 250/484.4; 428/690

(58) Field of Classification Search ................ 428/690, 428/292.1; 250/484.4, 584
See application file for complete search history.

(56) References Cited

U.S. PATENT DOCUMENTS

| | | | |
|---|---|---|---|
| 6,534,779 B1 * | 3/2003 | Kohda et al. | 250/589 |
| 6,784,448 B1 * | 8/2004 | Neriishi et al. | 250/584 |
| 2002/0166977 A1 * | 11/2002 | Kohda et al. | 250/484.4 |
| 2004/0051438 A1 * | 3/2004 | Leblans et al. | 313/467 |
| 2004/0069955 A1 * | 4/2004 | Maezawa et al. | 250/484.4 |

* cited by examiner

*Primary Examiner*—Rena Dye
*Assistant Examiner*—Camie S. Thompson
(74) *Attorney, Agent, or Firm*—Lucas & Mercanti, LLP

(57) ABSTRACT

A radiographic image conversion panel including, a support and a photostimulable phosphor layer formed on the support by a vapor deposition method. The support has a plurality of carbon fiber reinforced resin sheets each of which includes carbon fibers arranged in a direction and impregnated with a heat resistant resin such that directions of the carbon fibers in the carbon fiber reinforced resin sheets are different from each other and arranged at approximately equal angles.

5 Claims, 5 Drawing Sheets

FIG.5

RADIOGRAPHIC IMAGE CONVERSION PANEL

BACKGROUND OF THE INVENTION

1. Field of the Invention

The present invention relates to a radiographic image conversion panel including a support and a photostimulable phosphor layer which is formed on the support by a vapor phase deposition method.

2. Description of Related Art

Conventionally, the so-called radiography using a silver salt to obtain radiographic images has been utilized. However, a method for imaging radiographic patterns without using a silver salt have also been developed. That is, a method in which radiation transmitted through a subject is absorbed to a photostimulable phosphor, subsequently the photostimulable phosphor is excited with a certain energy to emit radiation energy accumulated in this photostimulable phosphor, and this fluorescence is detect to create a picture, is known.

As a particular method, a method for radiographic image conversion using a panel where a photostimulable phosphor layer is provided on a support and both or either visible light and infrared ray is used as excitation energy, is disclosed in U.S. Pat. No. 3,859,527.

Recently radiographic image conversion panels using the photostimulable phosphor where Eu is activated on alkali halide such as CsBr as a host have been proposed as means for photographic pattern conversion using a photostimulable phosphor with high luminance, high sensitivity and high sharpness. Particularly, it says that making Eu an activator enables improvement of X-ray conversion efficiency which has been impossible conventionally.

On the other hand, as materials of the support on which such a photostimulable phosphor layer is formed, for example, high molecular resins, ceramics, glasses, metals and the like are used, as shown in the specification of Japanese Patent No. 2899812. The high molecular resins are preferable because they are generally good in workability, radiation absorbability is low and transmittance is high, but on the other hand, mechanical strength is weak and heat resistance is not excellent. The ceramics, glasses and metals are sufficient for heat resistance but have a problem that the sensitivity thereof is lowered in use as the panel because the radiation absorbability is high and transmittance is low. Particularly, the photostimulable phosphor layer described above has been a problem that the production efficiency is lowered when glass is used as the support because the photostimulable phosphor layer is formed on the support by a vapor phase deposition method such as a deposition method and the photostimulable phosphor layer can be vapor-deposited on the glass support only in an very high temperature condition.

The present inventors have found it advantageous for solving the issues described above that carbon fiber reinforced plastic (CFRP) in which heat resistant resin is impregnated in carbon fibers is used as the support.

However, the above support is produced by arranging the carbon fibers in one direction. In the support, a plurality of carbon fiber reinforced plastic sheets in which the heat resistant resin such as epoxy resin is impregnated in carbon fibers are laminated, and these carbon fiber reinforced plastic sheets are cured by applying heat and pressure. Besides, the plurality of carbon fiber reinforced plastic sheets are laminated such that directions of the carbon fibers are aligned in one direction.

Therefore, when the photostimulable phosphor is vapor-deposited on such a support by the vapor deposition method to form the photostimulable phosphor layer, a thermal expansion coefficient of the photostimulable phosphor layer made up of CsBr or the like is large, and furthermore, residual stress at the vapor deposition is left on the support made up of the carbon fiber reinforced plastic sheets. Thus, a trouble occurs that the panel in which the photostimulable phosphor layer is formed on the support warps along the direction of carbon fibers in the support and this has sometimes caused uneven images.

SUMMARY OF THE INVENTION

The object of the present invention is to provide a radiographic image conversion panel where warps and uneven images due to thermal treatment can be reduced.

In order to accomplish the above object, in accordance with the first aspect of the invention, the radiographic image conversion panel comprises, a support and a photostimulable phosphor layer formed on the support by a vapor deposition method, wherein the support comprises a plurality of carbon fiber reinforced resin sheets each of which includes carbon fibers arranged in a direction and impregnated with a heat resistant resin such that directions of the carbon fibers in the carbon fiber reinforced resin sheets are different from each other and arranged at approximately equal angles.

According to the radiographic image conversion panel of the invention, since the directions of the carbon fibers in the carbon fiber reinforced resin sheets are arranged at approximately equal angles, the surface of the support becomes an uniform face and thus warps can be reduced. Further, as a result, uneven images can be also reduced.

In order to manufacture the radiographic image conversion panel according to the first aspect of the invention, the method may include the steps of: preparing a vapor deposition apparatus comprising a vacuum container, an evaporation source which is provided in the vacuum container and vapor-deposits the photostimulable phosphor on the support, and a support rotation mechanism for vapor-depositing the photostimulable phosphor from the evaporation source; rotating the support by the support rotation mechanism with supporting the support; and vapor-depositing the photostimulable phosphor evaporated from the evaporation source onto the rotating support to form the photostimulable phosphor layer.

According to the such a method for manufacturing the radiographic image conversion panel, since the photostimulable phosphor evaporated from the evaporation source is vapor-deposited on the support by rotating as well as supporting the support by the support rotation mechanism to form the photostimulable phosphor layer, the photostimulable phosphor layer is formed uniformly on the support. Further, since the photostimulable phosphor is vapor-deposited by rotating the support, the residual stress left at the vapor deposition is uniformly dispersed and thus the warps of the panel comprising the support and the photostimulable phosphor layer can be further reduced. Additionally, the uneven images can be also reduced.

According to the second aspect of the invention, the radiographic image conversion panel comprising, a support and a photostimulable phosphor layer formed on the support by a vapor deposition method, wherein the support comprises a plurality of carbon fiber reinforced resin sheets each of which includes carbon fibers arranged in a direction and impregnated with a heat resistant resin such that directions of the carbon fibers in the carbon fiber reinforced resin sheets are different from each other, and 60% or more carbon fibers in all of the carbon fiber reinforced resin sheets are arranged at approximately the same direction.

According to the radiographic image conversion panel of the invention, since the sheets are laminated such that 60% or more carbon fibers in all of the carbon fiber reinforced resin sheets are arranged at approximately the same direction, the support is apt to warp in the direction directed by the 60% or more carbon fibers due to the effect of heat or the like when forming the photostimulable phosphor layer on the support by the vapor phase deposition method. Therefore, by vapor-depositing the photostimulable phosphor on the support with transferring the support to the direction orthogonal to the direction to which the support warps, residual stress left at the vapor deposition and stress at the warp direction can be offset by making these stresses orthogonal. This can reduce the warps of the panel comprising the support and photostimulable phosphor layer. Further, the uneven images can be also reduced.

In the radiographic image conversion panel, preferably, the support comprises a plurality of carbon fiber reinforced resin sheets each of which includes carbon fibers arranged in two directions different from each other and 60% or more carbon fibers are directed to one of the different two directions.

Accordingly, since the support comprises a plurality of carbon fiber reinforced resin sheets each of which includes carbon fibers arranged in two directions different from each other, it is possible to make the structure simple and it is excellent in terms of manufacture.

In order to manufacture the radiographic image conversion panel according to the second aspect of the invention, the method may include the steps of: preparing a vapor deposition apparatus comprising a vacuum container, an evaporation source which is provided in the vacuum container, for vapor-depositing the photostimulable phosphor on the support, and a support transfer mechanism which vapor-deposits the photostimulable phosphor from the evaporation source by moving to a horizontal direction against the evaporation source as well as supporting the support, and a deposition preventing plate which is provided between the evaporation source and the support and where a slit is formed to be orthogonal to the transfer direction of the support; and vapor-depositing the photostimulable phosphor evaporated from the evaporation source onto the support to form the photostimulable phosphor layer by supporting and moving the support by the support transfer mechanism such that the direction of the 60% carbon fibers is orthogonalized to the transfer direction.

According to this method for manufacturing the radiographic image conversion panel, since the photostimulable phosphor evaporated from the evaporation source is vapor-deposited through the slit on the support to form the photostimulable phosphor layer by moving the support such that the direction of the 60% carbon fibers is orthogonalized to the transfer direction, the photostimulable phosphor layer is uniformly formed in the transfer direction of the support. The support easily warps to the direction directed by the 60% or more carbon fibers due to effects such as heat upon vapor-depositing the photostimulable phosphor layer on the support, but since in the invention, the photostimulable phosphor is vapor-deposited by moving the support such that the direction of the 60% carbon fibers is orthogonalized to the transfer direction, the residual stress left at the vapor deposition and the direction to which the support warps are orthogonalized. Therefore, these stresses are offset one another, and this can reduce the warps of the panel comprising the support and photostimulable phosphor layer. Further, uneven images can be also reduced.

In the method for manufacturing this radiographic image conversion panel, it is preferred that the evaporation source is heated by a resistance heating method.

By making the evaporation source one heated by a resistance heating method, the constitution of whole apparatus is relatively simple and handling of the apparatus is easy, and the apparatus is inexpensive and applicable for a great many substances, in comparison with other electron beam heating methods, heating methods by high-frequency wave induction or the like.

In the first or second aspect of the invention, it is preferred that at least a layer of the photostimulable phosphor layers contains a photostimulable phosphor which comprises an alkali halide as a host and is represented by the following general formula (1), $$M^1X.aM^2X'_2.bM^3X''_3:eA \qquad (1)$$

where $M^1$ is at least one alkali metal atom selected from respective atoms of Li, Na, K, Rb and Cs; $M^2$ is at least one bivalent metal atom selected from respective atoms of Be, Mg, Ca, Sr, Ba, Zn, Cd, Cu and Ni; $M^3$ is at least one trivalent metal atom selected from respective atoms of Sc, Y, La, Ce, Pr, Nd, Pm, Sm, Eu, Gd, Tb, Dy, Ho, Er, Tm, Yb, Lu, Al, Ga and In; X, X' and X" are at least one halogen atom selected from respective atoms of F, Cl, Br and I; "A" is at least one metal atom selected from respective atoms of Eu, Tb, In, Ce, Tm, Dy, Pr, Ho, Nd, Yb, Er, Gd, Lu, Sm, Y, Tl, Na, Ag, Cu and Mg; and "a", "b" and "e" represent values in ranges of $0 \leq a < 0.5$, $0 \leq b < 0.5$ and $0 < e \leq 0.2$, respectively.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein.

DETAILED DESCRIPTION OF THE INVENTION

The present invention will be described in detail as follows.

Figure 1:
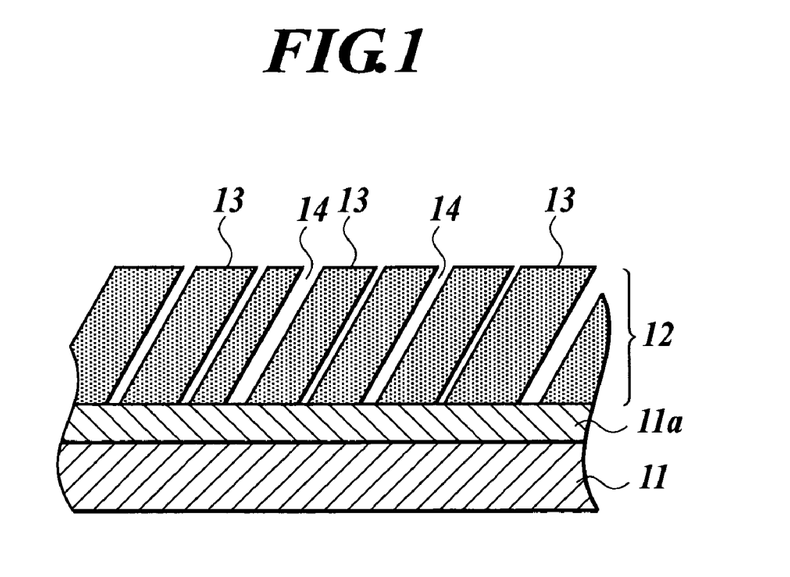
FIG. 1 is a schematic sectional view showing an example of a photostimulable phosphor layer having columnar crystals formed on a support.

First Embodiment:

As shown in FIG. 1, the radiographic image conversion panel of the invention has a support 11 and a photostimulable phosphor layer 12 which has columnar crystals 13 of the photostimulable phosphor formed on the support by a vapor phase deposition method and spaces 14 formed between the columner crystals 13, and optionally, a protection layer (not shown) is provided for protecting the photostimulable phosphor layer 12. Reference numeral 11a denotes a resin layer described below.

The support according to the invention is produced by laminating a plurality of carbon fiber reinforced plastic sheets in each of which the carbon fibers are arranged in one direction and the heat resistant resin is impregnated in the carbon fibers. The directions of respective carbon fibers in the plurality of laminated carbon fiber reinforced plastic sheets are different from one another and are arranged at approximately equal angles. Accordingly, it is possible to reduce the amount of warp of the radiographic image conversion panel of the invention which is provided with the support and the photostimulable phosphor layer, and further it also becomes possible to reduce the unevenness of an image.

The carbon fiber reinforced plastic sheet is one in which uncured heat resistant resin (thermally curable resin) is impregnated in the sheet made by arranging a large number of carbon fibers in one direction, the so-called prepreg. Specifically, included are commercially available carbon fibers (#132, epoxy resin impregnation supplied from Toho Rayon Co., Ltd.). The resins impregnated in the carbon fibers could be heat resistant resins, and include, for example, epoxy resins, vinylester resins, nylon, polycarbonate, phenol resins, polyimide and the like. Particularly, epoxy resins and polyimide can be used suitably for the invention in terms of excellent radiation resistance.

The support of the invention is produced by laminating the above plurality of carbon fiber reinforced plastic sheets, and the directions directed by respective carbon fibers in the plurality of carbon fiber reinforced plastic sheets are laminated to arrange at approximately equal angles.

Figure 4:
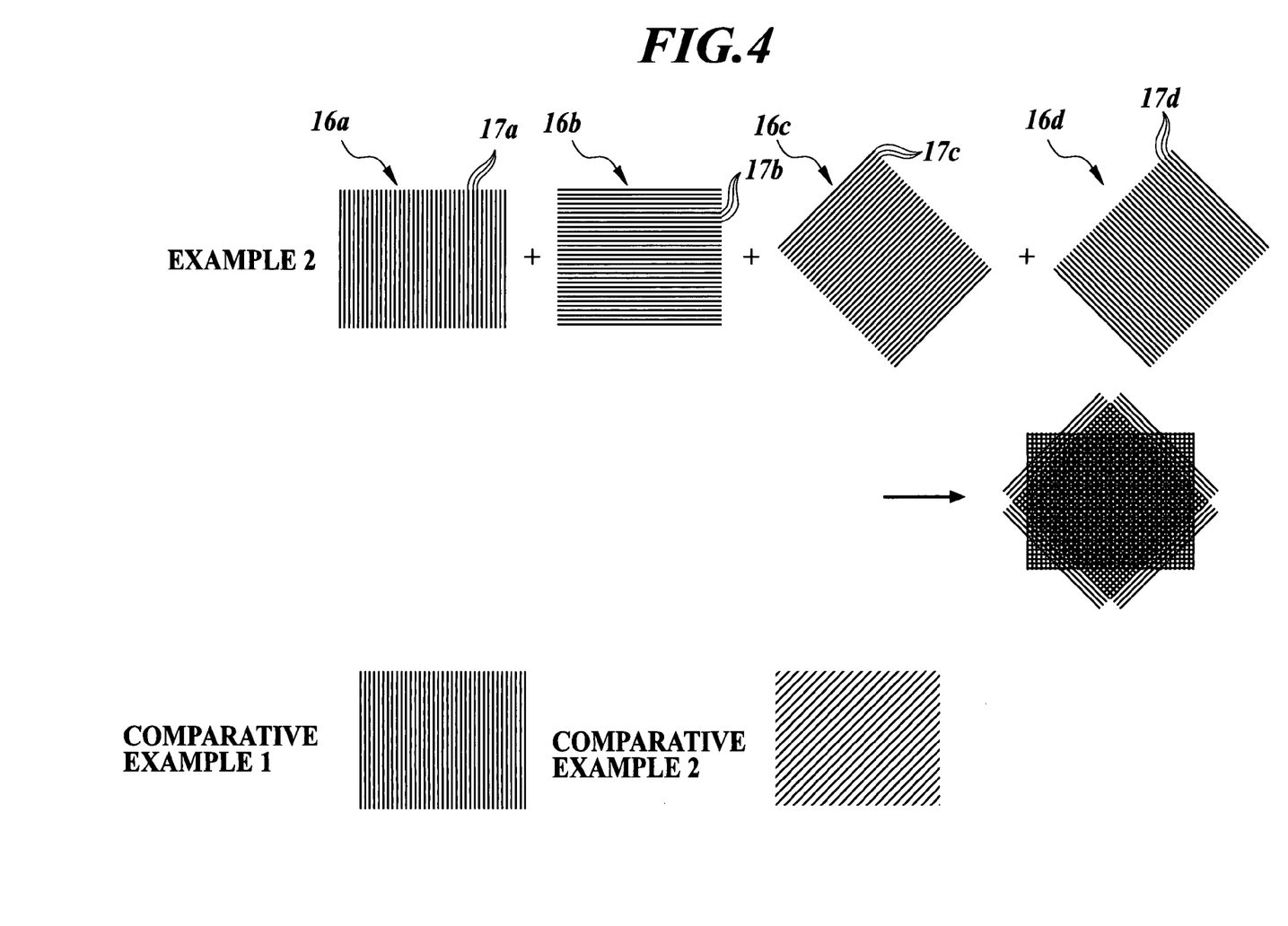
FIG. 4 is a view showing lamination states of carbon fiber reinforced plastic sheets in Example 2 and Comparative Examples 1 and 2.

For example, as is shown in Example 2 in FIG. 4, the sheets are laminated such that in all of the carbon fiber reinforced plastic sheets, the carbon fibers 17a in 25% carbon fiber reinforced plastic sheets 16a are directed to the direction of 0°, the carbon fibers 17b in 25% carbon fiber reinforced plastic sheets 16b are directed to the direction of 90°, the carbon fibers 17c in 25% carbon fiber reinforced plastic sheets 16c are directed to the direction of 45°, and the carbon fibers 17d in 25% carbon fiber reinforced plastic sheets 16d are directed to the direction of −45°. That is, the respective carbon fibers are arranged at 45° intervals.

Here, since the sheets with the same standard are used for all of the carbon fiber reinforced plastic sheets, 25% carbon fiber reinforced plastic sheets indicate 25% sheets of the carbon fiber reinforced plastic sheets in all sheets of the carbon fiber reinforced plastic sheets. The thickness of a sheet of the carbon fiber reinforced plastic sheets is preferably from 50 μm to 800 μm, and more preferably from 100 μm to 400 μm. The number of laminated sheets is preferably from 4 to 40 layers, and more preferably from 10 to 30 layers. It is preferred that the number of the carbon fiber reinforced plastic sheets including the carbon fibers directed to each direction is the same.

Further, for the direction of carbon fibers, the direction of carbon fibers arranged to the direction parallel or perpendicular to each side of the carbon fiber reinforced plastic sheet is defined as 0°, and angles to this carbon fiber at 0° are shown, respectively.

The support is produced as follows. A plurality of carbon fiber reinforced plastic sheets in each of which the carbon fibers are arranged in an appropriate direction and uncured thermally curable resin is impregnated in the carbon fibers, are laminated such that the carbon fibers in the carbon fiber reinforced plastic sheet are directed in the given direction, subsequently introduced into a heating apparatus, heated, and pressed by using rollers. This manufactures the support by curing the impregnated heat resistant resin (thermally curable resin).

In the Example 2 described as one example, the sheets are laminated such that the carbon fibers are directed to different four directions, but the directions are not limited thereto, the sheets may be laminated such that the carbon fibers are directed to two directions, three directions and five or more directions. Three or more directions are preferable. The order of laminating the carbon fiber reinforced plastic sheets is not particularly limited, but it is preferred that the carbon fiber reinforced plastic sheets each containing carbon fibers directed to a respective direction are laminated in order at an approximately equal angle to the carbon fibers direction of next sheet, respectively because the sheets make the surface of the support flat and smooth.

It is preferred that the support has a resin layer in order to make the surface flat and smooth. It is preferred that the resin layer contains compounds such as polyimide, polyethylene terephthalate, paraffin and graphite, and that the film thickness thereof is from about 5 μm to 50 μm. This resin layer may be provided on the surface or a back face of the support, but it is preferable to provide on both faces in terms of reducing warp of the panel of the invention.

The way to provide a resin layer on the support includes a lamination method, a coating arrangement method and the like.

The lamination is carried out by using heating and pressing rollers, under a heating condition of a temperature at about 80 to 150° C., a pressing condition of 4.90×10 to 2.94×10² N/cm² and a transfer condition of 0.1 to 2.0 m/second, preferably.

Preferably, at least a layer of the photostimulable phosphor layers contains a photostimulable phosphor which comprises an alkali halide as a host and is represented by the following general formula (1), $$M^1X.aM^2X'_2.bM^3X''_3:eA \qquad (1)$$

where $M^1$ is at least one alkali metal atom selected from respective atoms of Li, Na, K, Rb and Cs; $M^2$ is at least one bivalent metal atom selected from respective atoms of Be, Mg, Ca, Sr, Ba, Zn, Cd, Cu and Ni; $M^3$ is at least one trivalent metal atom selected from respective atoms of Sc, Y, La, Ce, Pr, Nd, Pm, Sm, Eu, Gd, Tb, Dy, Ho, Er, Tm, Yb, Lu, Al, Ga and In; X, X' and X'' are at least one halogen atom selected from respective atoms of F, Cl, Br and I; "A" is at least one metal atom selected from respective atoms of Eu, Tb, In, Ce, Tm, Dy, Pr, Ho, Nd, Yb, Er, Gd, Lu, Sm, Y, Tl, Na, Ag, Cu and Mg; and "a", "b" and "e" represent values in ranges of $0 \leq a < 0.5$, $0 \leq b < 0.5$ and $0 < e \leq 0.2$, respectively.

In the photostimulable phosphor represented by the above general formula (1), $M^1$ represents at least one metal atom selected from the atoms of Li, Na, K, Rb and Cs and the like, in particular, preferred is at least one alkaline earth metal atom selected from the atoms of Rb and Cs, and Cs atom is more preferable.

$M^2$ represents at least one bivalent metal atom selected from the atoms of Be, Mg, Ca, Sr, Ba, Zn, Cd, Cu and Ni and the like, and among others, one preferably used is the bivalent metal atom selected from the atoms of Be, Mg, Ca, Sr and Ba and the like.

$M^3$ represents at least one trivalent metal atom selected from the atoms of SC, Y, La, Ce, Pr, Nd, Pm, Sm, Eu, Gd, Tb, Dy, Ho, Er, Tm, Yb, Lu, Al, Ga, and In and the like, and among others, one preferably used is the trivalent metal atom selected from the atoms of Y, Ce, Sm, Eu, Al, La, Gd, Lu, Ga and In and the like.

"A" is at least one metal atom selected from the atoms of Eu, Tb, In, Ce, Tm, Dy, Pr, Ho, Nd, Yb, Er, Gd, Lu, Sm, Y, Tl, Na, Ag, Cu and Mg.

In the light of photostimulated luminescence luminance improvement of the photostimulable phosphor, X, X' and X" represent at least one halogen atom selected from the atoms of F, Cl, Br and I, preferable is at least one halogen atom selected from the atoms of F, Cl and Br, and more preferable is at least one halogen atom selected from the atoms of Br and I.

In the general formula (1), the value of "b" is $0 \leq b < 0.5$, and preferably $0 \leq b < 10^{-2}$.

The photostimulable phosphor represented by the general formula (1) of the invention is manufactured, for example by the method described below.

As basic ingredients of the phosphor, (a) used are at least one or two or more compounds selected from NaF, NaCl, NaBr, NaI, KF, KCl, KBr, KI, RbF, RbCl, RbBr, RbI, CsF, CsCl, CsBr, and CsI.

(2) Used are at least one or two or more compounds selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2.2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$, and $NiI_2$.

(c) In the above general formula (1), used is the compound having the metal atom selected from the atoms of Eu, Tb, In, Cs, Ce, Tm, Dy, Pr, Ho, Nd, Yb, Er, Gd, Lu, Sm, Y, Tl, Na, Ag, Cu and Mg and the like.

The phosphor basic ingredients of the above (a) to (C) are weighed to make a mixture constitution in the above value ranges, and dissolved in pure water.

At that time, the mixture may be thoroughly mixed using a mortar, ball mill and mixer mill.

Next, the given acid is added to adjust pH value C of the obtained aqueous solution to $0 < C < 7$, and subsequently water is evaporated and vaporized.

Next, the obtained basic ingredient mixture is filled in a heat resistant container such as a quartz or alumina crucible, and calcined in an electric furnace. A calcining temperature at 500 to 1000° C. is preferable. A calcining time period varies depending on a filled amount, the calcining temperature and the like, of the basic ingredient mixture, however, 0.5 to 6 hours is preferable.

For a calcining atmosphere, preferred is a mild reducing atmosphere such as a nitrogen gas atmosphere comprising hydrogen gas at a small amount and a carbon dioxide gas atmosphere comprising carbon monoxide at a small amount, a neutral atmosphere such as the nitrogen gas atmosphere and an argon gas atmosphere, or a mild oxidizing atmosphere comprising oxygen gas at a small amount.

It is possible to further enhance the luminescence luminance of the photostimulable phosphor by after calcining once under the above calcining condition, removing a calcined matter from the electric furnace and pulverizing, thereafter, filling calcined powder again in the heat resistant container and placing in the electric furnace, and calcining again under the same condition as the above-described one. When the calcined matter is cooled from the calcining temperature to the room temperature, the desired photostimulable phosphor can be obtained by removing the calcined matter from the electric furnace and standing it in air to cool, but it may be cooled in the same mild reducing atmosphere or neutral atmosphere as that at the calcination.

It is also possible to still further enhance the luminescence luminance of the obtained photostimulable phosphor by moving the calcined matter from a heating section to a cooling section in the furnace and rapidly cooling in the mild reducing atmosphere, the neutral atmosphere or the mild oxidizing atmosphere, and thus it is preferable.

The photostimulable phosphor layer of the invention is formed by a vapor phase deposition method.

As the vapor phase deposition methods of the photostimulable phosphor, it is possible to use a vapor deposition method, a sputtering method, a CVD method, an ion plating method, and the like, but the vapor deposition method is particularly preferable in the invention.

The vapor deposition method suitable for the invention will be described below. Here, the photostimulable phosphor is vapor-deposited on the support using a vapor deposition apparatus shown in FIG. 3, and thus, the method is described together with the description of the vapor deposition apparatus.

Figure 3:
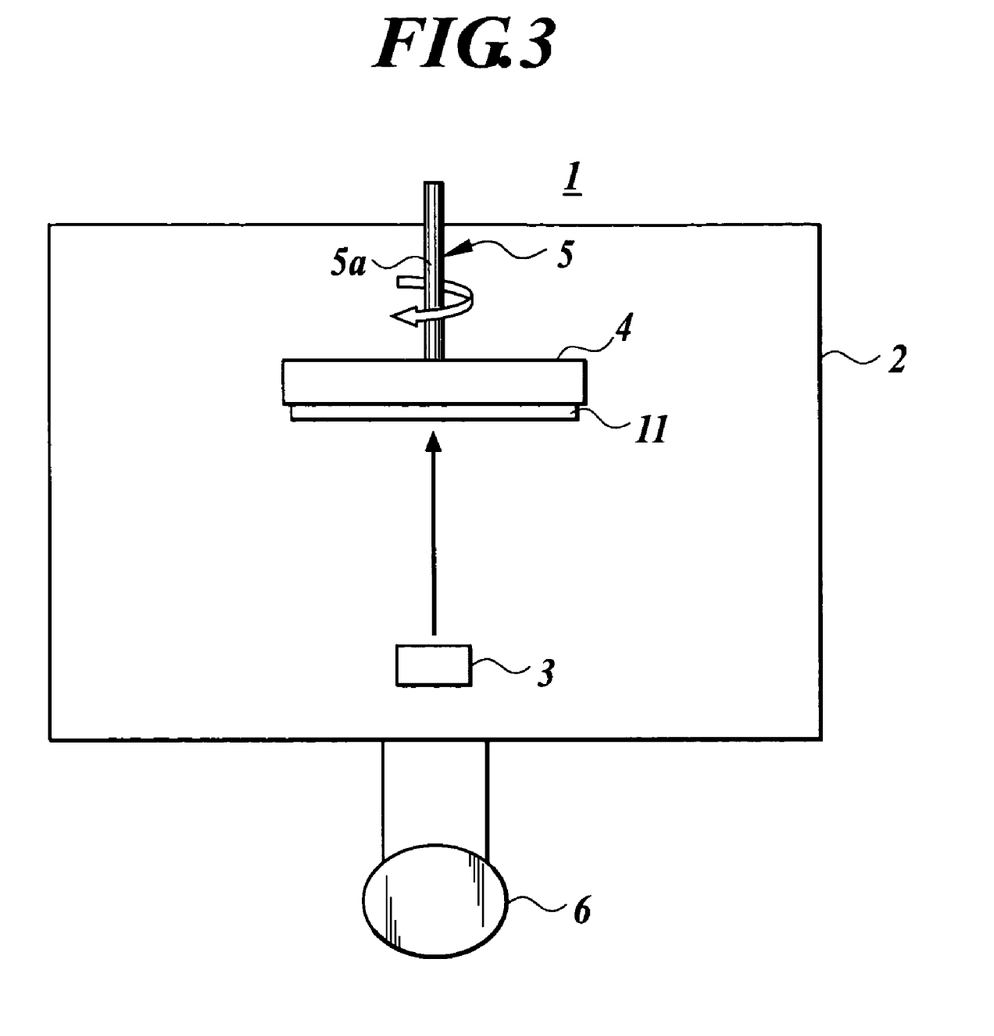
FIG. 3 is a sectional view showing a schematic constitution of a vapor deposition apparatus according to the first embodiment of the invention.

As shown in FIG. 3, the vapor deposition apparatus comprises a vacuum container 2, an evaporation source 3 which is provided in the vacuum container 2, for vapor-depositing vapor on the support 11, a support holder 4 for holding the support 11, a support rotation mechanism 5 for vapor-depositing the vapor from the evaporation source 3 by rotating the support holder 4 against the evaporation source 3, and a vacuum pump 6 for performing evacuation and introduction of air in the vacuum container 2.

The evaporation source 3 is for accommodating and heating photostimulable phosphor by a resistance heating method. Therefore, it may be composed of an alumina crucible to which a heater is winded, or composed of a heater made up of ports and metals with high melting point. The method for heating the photostimulable phosphor may be the methods such as heating with electron beams and heating by induction of high frequency wave in addition to the resistance heating method, but in the invention, the resistance heating method is preferable in that handling is easy because of relatively simple constitution, cost is low, and it is applicable for great many substances. The evaporation source 3 may be a molecular beam source by molecular beam epitaxy.

The support rotation mechanism 5 is composed of, for example, a rotation axis 5a which holds the support holder 4 as well as rotates the support holder 4, a motor (not shown) which is disposed outside the vacuum container 2 and acts as a driving source for the rotation axis 5a, and the like.

It is also preferred that the support holder 4 is provided with a hot heater (not shown) for heating the support 11. By heating the support 11, it is possible to remove and eliminate absorbed matters on the surface of the support 11, and to prevent occurrence of impurity layers between the surface of the support 11 and the photostimulable phosphor, strengthen adhesiveness and regulate film quality of the photostimulable phosphor layer.

A shutter (not shown) for blocking the space from the evaporation source 3 to the support 11 may further be provided between the support 11 and the evaporation source 3. By the shutter, substances other than the object adhered to the surface of the photostimulable phosphor can be evaporated at an initial stage of the vapor deposition to prevent them from adhering to the support.

To form the photostimulable phosphor layer on the support 11 by using the vapor deposition apparatus 1 which is composed in such a way, first, the support 11 is attached to the support holder 4.

Then, the air in the vacuum container 2 is discharged. Subsequently, the support holder 4 is rotated with respect to the evaporation source 3 by the support rotation mechanism 5, and when the vacuum container 2 reaches a vacuum degree at which the vapor deposition is feasible, the photostimulable phosphor is evaporated from the heated evaporation source 3 to make the photostimulable phosphor grow to the desired thickness on the surface of the support 11.

Figure 2:
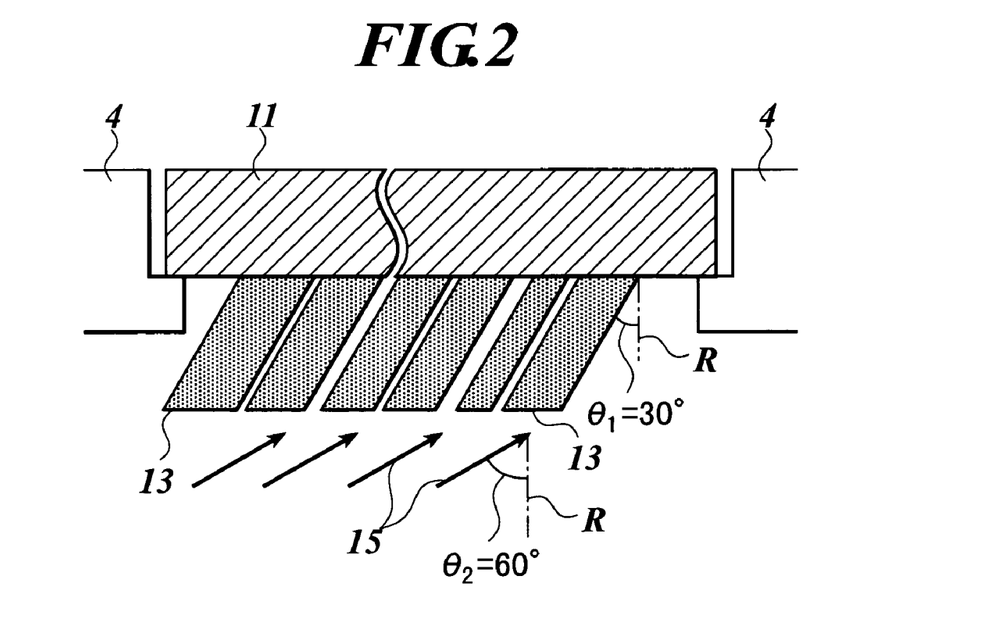
FIG. 2 is a view showing an appearance in which a photostimulable phosphor layer is formed on a support by a vapor deposition method.

FIG. 2 is a view showing an appearance where the photostimulable phosphor layer 12 is formed on the support 11 by vapor deposition. When an incident angle of vapor flow 15 of the photostimulable phosphor to the normal line direction (R) of the surface of support 11 which is fixed to support holders 4 is $\theta_2$ (60° in the figure) and the angle of the formed columnar crystal 13 to the normal line direction (R) of the support surface is $\theta_1$ (30° in the figure), the angle $\theta_1$ empirically becomes approximately a half of the angle $\theta_2$ and the columnar crystals 13 are formed at this angle. In the invention, since the vapor deposition apparatus 1 in FIG. 3 is used, the incident angle $\theta_2$ of the vapor flow 15 is 0°.

Here, the photostimulable phosphor layer 12 which does not contain a binding agent is formed, but a filler such as the binding agent may be filled in the spaces 14 formed between the columner crystals 13, and it reinforces the photostimulable phosphor layer 12. Additionally, the substance with high light absorption or the substance with high light reflection may be filled. This makes it have reinforcing effects, and additionally this is effective for reducing light diffusion in a lateral direction of photostimulated excitation light which has entered into the photostimulable phosphor layer 12.

It is also possible to form the photostimulable phosphor layer by splitting into a plurality of depositions in the vapor deposition step. Further, in the vapor deposition step, it is also possible to synthesize the aimed photostimulable phosphor on the support and simultaneously form the photostimulable phosphor layer by co-depositing with using a plurality of resistance heating machines or electron beams.

In the vapor deposition method, a vapor-deposited body (support, protection layer or intermediate layer) may be cooled or heated at the vapor deposition if necessary.

After the completion of vapor deposition, the photostimulable phosphor layer may also be treated with heat. Besides, in the vapor deposition method, reactive vapor deposition may also be performed where the vapor deposition is performed by introducing a gas such as $O_2$ and $H_2$ as needed.

The film thickness of the formed photostimulable phosphor layer varies depending on the intended use of the radiographic image conversion panel and the type of photostimulable phosphor. In the light of obtaining the effects of the invention, the film thickness is from 50 μm to 2000 μm, preferably from 50 μm to 1000 μm, and more preferably from 100 μm to 800 μm.

In forming the above-described photostimulable phosphor layer by the above vapor phase deposition method, the temperature of the support on which the photostimulable phosphor layer is formed is preferably set at the room temperature (rt) to 300° C., and more preferably from 50 to 200° C.

After the photostimulable phosphor layer is formed as described above, the radiographic image conversion panel is manufactured by providing the protection layer at the side of the photostimulable phosphor layer opposite to the support as needed. The protection layer may be formed by directly coating a coating solution for the protection layer on the surface of the photostimulable phosphor layer, or a protection layer which has been formed separately in advance may be bonded to the photostimulable phosphor layer.

As materials of the protection layer, used are common materials for the protection layer such as cellulose acetate, nitrocellulose, polymethylmethacrylate, polyvinyl butyral, polyvinyl formal, polycarbonate, polyester, polyethylene terephthalate, polyethylene, polyvinylidene chloride, nylon, polytetrafluoroethylene, polytrifluoroethylene chloride, tetrafluoroethylene-hexafluoropropylene copolymer, vinylidene chloride-vinyl chloride copolymer, and vinylidene chloride-acrylonitrile copolymer. In addition to them, a clear glass substrate can be also used as the protection layer.

The protection layer may also be formed by laminating inorganic substances such as SiC, $SiO_2$, SiN, $Al_2O_3$ or the like by the vapor deposition method or the sputtering method. The thickness of the protection layer is preferably from 1 μm to 2000 μm.

Second Embodiment:

The second embodiment of the invention is different from the first embodiment in the support, and the method for manufacturing the radiographic image conversion panel including the method for manufacturing the support and the vapor deposition method for forming the photostimulable phosphor layer and the like. Since the remaining points are approximately the same, only different points will be explained and for the same parts, the same reference numerals or signs will be given and the explanation thereof will be omitted.

The support according to the invention is produced by laminating a plurality of carbon fiber reinforced plastic sheets in each of which carbon fibers are arranged in one direction and a heat resistant resin is impregnated in the carbon fibers such that the carbon fibers in the carbon fiber reinforced plastic sheets are directed to a plurality of directions, and 60% or more carbon fibers in the carbon fibers in all of the carbon fiber reinforced plastic sheets are directed to the same direction. This can reduce warp of the radiographic image conversion panel of the invention which has the support and the photostimulable phosphor, and also enables to reduce unevenness of images.

Figure 6:
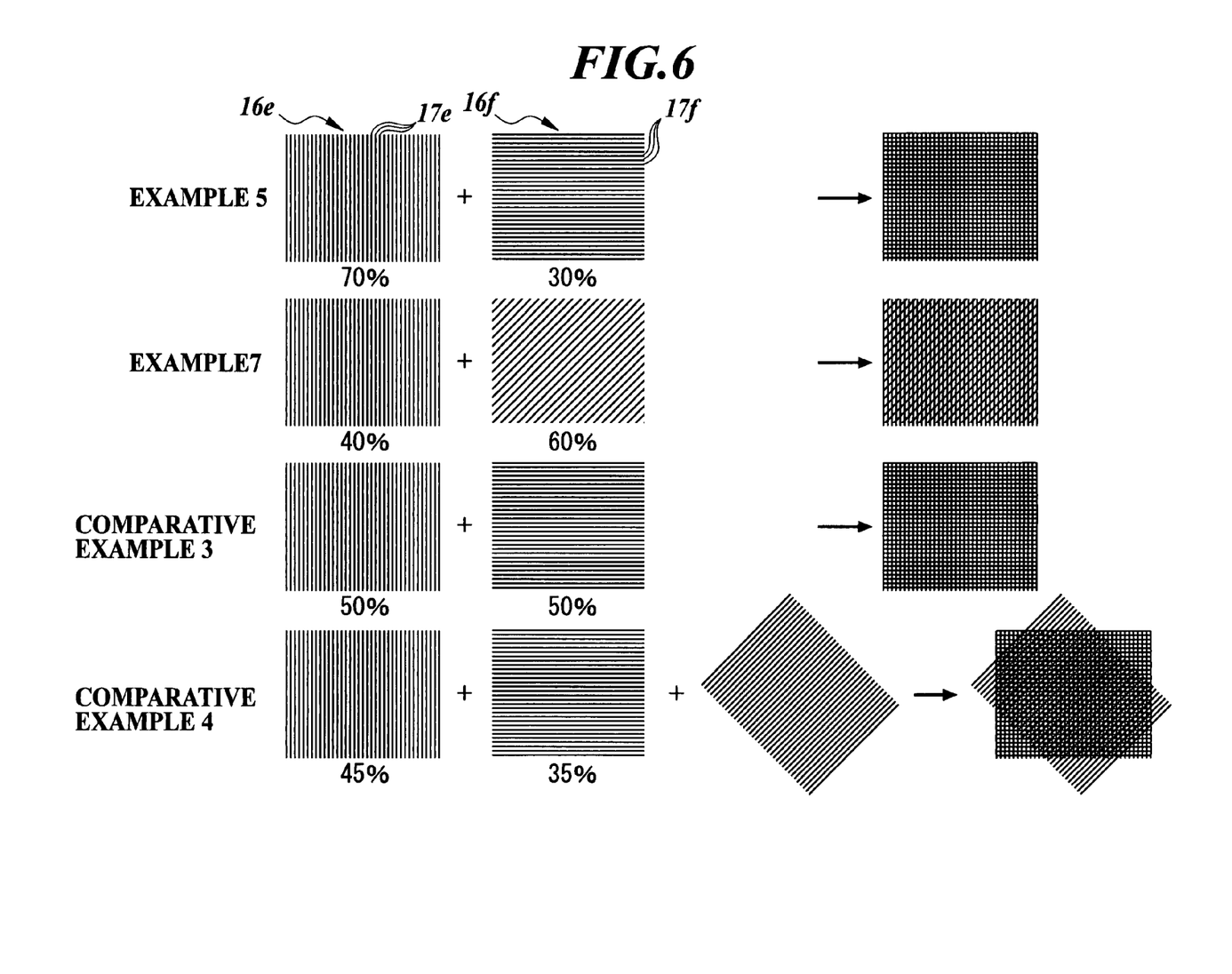
FIG. 6 is a view showing lamination states of carbon fiber reinforced plastic sheets in Examples 5 and 7, and Comparative Examples 3 and 4.

That is, for example, as shown in the Example 5 in FIG. 6, in all of the carbon fiber reinforced plastic sheets, 70% carbon fiber reinforced plastic sheets 16e are laminated such that the carbon fibers 17e in the sheets 16e are directed to 0° direction, and 30% carbon fiber reinforced plastic sheets 16f are laminated such that the carbon fibers 17f in the sheets 16f are directed to 90° direction.

Here, since the sheets of the same standard are used for all of the carbon fiber reinforced plastic sheets, for example, 70% carbon fiber reinforced plastic sheets indicates the carbon fiber reinforced plastic sheets with sheet number of 70% of that of the entire carbon fiber reinforced plastic sheets.

A thickness of one carbon fiber reinforced plastic sheet is preferably 50 μm to 800 μm, and more preferably 100 μm to 400 μm. The number of laminated sheets is preferably 4 to 40 layers, and more preferably from 10 to 30 layers. For the direction of the carbon fibers, the direction (a slit direction) perpendicular to a transfer direction in a vapor deposition apparatus described below is defined as 0°.

The support is manufactured by laminating a plurality of carbon fiber reinforced plastic sheets in each of which carbon fibers are arranged in one direction and uncured heat resistant resin is impregnated in the carbon fibers such that the carbon fibers in the every carbon fiber reinforced plastic sheets are directed to the given directions, subsequently introducing the carbon fiber reinforced plastic sheets in a heating apparatus, heating, and pressing them by using rollers. As a result, the impregnated heat resistant resin (thermally curable resin) is cured and the support is manufactured.

In the Example 5 described above as one example, the sheets are laminated such that the carbon fibers are directed to different two directions, but the directions are not limited thereto, and the sheets may be laminated such that the carbon fibers are directed to three or more directions. An order laminating the carbon fiber reinforced plastic sheets comprising the carbon filters directed to respective directions is not particularly limited, but it is preferred that the sheets are laminated in order such that the carbon fiber reinforced plastic sheets containing carbon fibers directed to respective directions are laminated at approximately equal angles to the carbon fibers direction of the next sheet because of making surface of the support flat and smooth.

The photostimulable phosphor layer of the invention is formed by a vapor phase deposition method.

As the vapor phase deposition method of the photostimulable phosphor, it is possible to use a vapor deposition method, a sputtering method, a CVD method, an ion plating method, and the like, but in the invention, the vapor deposition method is particularly preferable.

The vapor deposition method suitable for the invention is described below. Here, the photostimulable phosphor is vapor-deposited on the support by using a vapor deposition apparatus shown in FIG. 5, and thus, the method will be described along with the description of the vapor deposition apparatus.

Figure 5:
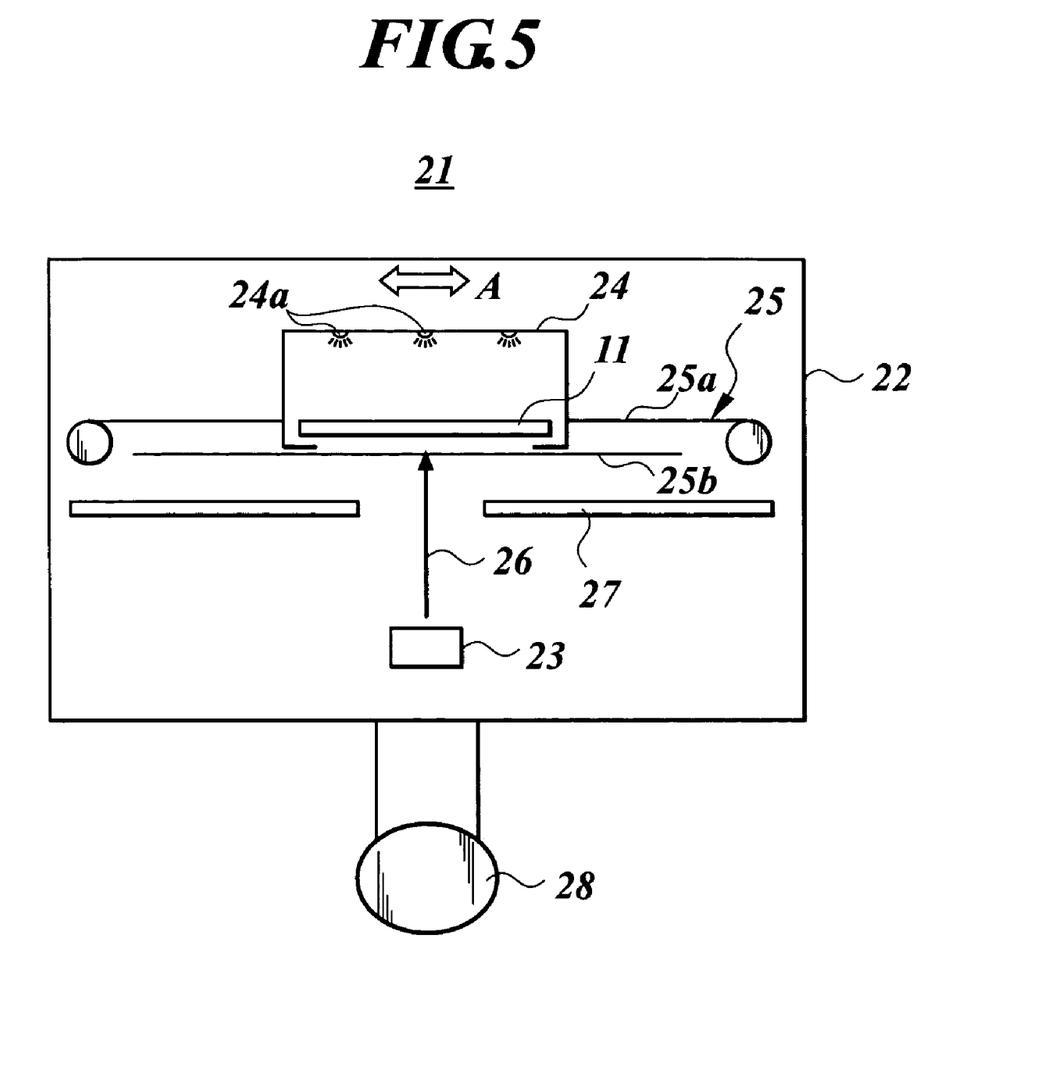
FIG. 5 is a sectional view showing a schematic constitution of a vapor deposition apparatus according to the second embodiment of the invention.

As shown in FIG. 5, the vapor deposition apparatus 21 comprises a vacuum container 22, an evaporation source 23 which is provided in the vacuum container 22, for vapor-depositing a predetermined vapor on the support 11, a support holder 24 which holds the support 11, a support transfer mechanism 25 which vapor-deposits the vapor from the evaporation source 23 by reciprocating the support holder 24 in a horizontal direction against the evaporation source 23, a deposition preventing plate 27 which is provided between the support 11 and the evaporation source 23 and where a slit 26 is formed to block the space from the evaporation source 23 to the support 11, and a vacuum pump 28 which performs discharge and introduction of air in the vacuum container 22. The slit 26 is formed in the direction orthogonal to the transfer direction of the support 11.

The evaporation source 23 includes and heats the photostimulable phosphor by a resistance heating method, and thus may be composed of an alumina crucible to which a heater is winded, or composed of a heater made up of ports and metals with high melting point. Also, the method for heating the photostimulable phosphor may be the methods such as heating with electron beams and heating by induction of high frequency wave in addition to the resistance heating method, but in the invention, the resistance heating method is preferable in that handling is easy because of relatively simple constitution, cost is low, and it is applicable for great many substances. Also, the evaporation source 23 may be a molecular beam source by molecular beam epitaxy.

The support transfer mechanism 25 is composed of, for example, a wire 25a and a guide rail 25b for the transfer mechanism which conveys the support holder 24 in the horizontal direction, a motor (not shown) which is a driving source, and the like.

It is preferred that the support holder 24 comprises a hot heater 24a which heats the support 11. By heating the support 11, it is possible to remove and eliminate absorbed matters on the surface of the support 11, prevent occurrence of impurity layers between the surface of the support 11 and the photostimulable phosphor, strengthen adhesiveness and regulate film quality of the photostimulable phosphor layer.

In order to form the photostimulable phosphor layer on the support 11 by using the vapor deposition apparatus 21 with such a structure, first, the support is attached to the support holder 24. At that time, the support 11 is attached to the support holder 24 such that the direction of the carbon fibers in 60% or more carbon filter reinforced plastic sheets described above in the carbon filter reinforced plastic sheets which form the support 11 is orthogonal to the transfer direction "A" to convey the support 11. That is, the support is disposed such that the direction of the carbon fibers corresponds to the direction of the slit 26.

Then, vacuum discharge is performed in the vacuum container 22. Subsequently, the support holder 24 is reciprocated in the horizontal direction by the support transfer mechanism 25, and when the vacuum container 22 reach a vacuum degree at which vapor deposition is feasible, the photostimulable phosphor is evaporated from the heated evaporation source 23 to make the photostimulable phosphor grow to the desired thickness on the support 11 surface through the slit of the deposition preventing plate 27.

EXAMPLES

The present invention is specifically described below by citing (A) Examples corresponding to the first embodiment of the invention (Examples 1 to 4, and Comparative Examples 1 and 2), and (B) Examples corresponding to the second embodiment of the invention (Examples 5 to 11, and Comparative Examples 3 to 6), however, the embodiments of the invention are not limited thereto.

A (Production of Support)

First, supports according to the Examples 1 to 4, the Comparative Examples 1 and 2 of the radiographic image conversion panels shown below were produced. The direction of carbon fibers described below indicates each angle to the carbon fibers at 0° when the direction of carbon fibers arranged in the direction parallel or perpendicular to each side of carbon fiber reinforced plastic sheet is rendered 0°.

Example 1

A plurality of carbon fiber reinforced plastic sheets each having a film thickness of 200 μm were laminated, heated at 130° C. and pressed with pressure of 100N/cm$^2$ to obtain a support. Here, the sheets were laminated such that the direction of the carbon fibers in 50% carbon fiber reinforced plastic sheets was 0° and the direction of the carbon fibers in 50% carbon fiber reinforced plastic sheets was 90°, in all of the carbon fiber reinforced plastic sheets.

Example 2

The support was obtained by the same manner as that in the Example 1, except that the sheets were laminated such that the direction of the carbon fibers in 25% carbon fiber reinforced plastic sheets was 0°, the direction of the carbon fibers in 25% carbon fiber reinforced plastic sheets was 90°, the direction of the carbon fibers in 25% carbon fiber reinforced plastic sheets was 45°, and the direction of the carbon fibers in 25% carbon fiber reinforced plastic sheets was −45°, in all of the carbon fiber reinforced plastic sheets (see FIG. 4).

Example 3

The support was obtained by the same manner as that in the Example 1, except that the sheets were laminated such that the direction of the carbon fibers in 10% carbon fiber reinforced plastic sheets was 0°, the direction of the carbon fibers in 10% carbon fiber reinforced plastic sheets was 90°, the direction of the carbon fibers in 20% carbon fiber reinforced plastic sheets was 30°, the direction of the carbon fibers in 20% carbon fiber reinforced plastic sheets was −30°, the direction of the carbon fibers in 20% carbon fiber reinforced plastic sheets was 60°, and the direction of the carbon fibers in 20% carbon fiber reinforced plastic sheets was −60°, in all of the carbon fiber reinforced plastic sheets.

Example 4

The support was obtained by the same manner as that in the Example 1, except that the sheets were laminated such that the direction of the carbon fibers in 20% carbon fiber reinforced plastic sheets was 0°, the direction of the carbon fibers in 20% carbon fiber reinforced plastic sheets was 90°, the direction of the carbon fibers in 15% carbon fiber reinforced plastic sheets was 30°, the direction of the carbon fibers in 15% carbon fiber reinforced plastic sheets was −30°, the direction of the carbon fibers in 15% carbon fiber reinforced plastic sheets is 60°, and the direction of the carbon fibers in 15% carbon fiber reinforced plastic sheets was −60°, in all of the carbon fiber reinforced plastic sheets.

Comparative Example 1

The sheets were laminated such that the directions of carbon fibers in all of the carbon fiber reinforced plastic sheets were 0°, that is, the directions of carbon fibers are parallel or perpendicular to each side of the carbon fiber reinforced plastic sheet, and all the carbon fibers are directed in the same direction (see FIG. 4).

Comparative Example 2

The sheets were laminated such that the directions of carbon fibers in all of the carbon fiber reinforced plastic sheets were 45° (see FIG. 4)

(Production of Radiographic Image Conversion Panel)

A photostimulable phosphor (CsBr: 0.001 Eu) was vapor-deposited on a surface of the support produced by the above-described manner, through a vapor deposition apparatus 1 shown in FIG. 3 to form a photostimulable phosphor layer.

First, the above phosphor basic ingredient was filled as a vapor deposition material in a resistance heating crucible, and the support 11 was placed in a rotating support holder 4. Subsequently, an air inside the vapor deposition apparatus 1 was once discharged, N2 gas was introduced to adjust a vacuum degree at 0.1 Pa, and then the temperature of the support 11 was retained at 200° C. with rotating the support 11 at a velocity of 10 rpm. Then, the resistance heating crucible was heated to vapor-deposit the photostimulable phosphor, and the vapor deposition was terminated when a film thickness of the photostimulable phosphor layer became 500 μm.

Then, a protection layer having borosilicate glass was overlaid on the photostimulable phosphor layer in dried air, and peripheries of the support 11 and the protection layer were enclosed by an adhesive to obtain a radiographic image conversion panel with a structure where the photostimulable phosphor layer is sealed.

The obtained radiographic image conversion panels were evaluated as follows.

<Warp of Panel>

The measured warp amounts of the radiographic image conversion panels are shown in Table 1. In the measurement, spaces of upper two corners when each radiographic image conversion panel was propped against a stainless plate with a good straightness at an angle of 5° and then spaces of the remaining two corners when a 180° turn of the conversion panel was performed were measured by a thickness gauge, and the maximum value was rendered the warp amount (mm).

<Uneven Image (Uneven Luminance)>

X ray with tube voltage of 80 kVp was evenly irradiated to the radiographic image conversion panel (450 mm×450 mm) from the support side opposite to the photostimulable phosphor layer. Subsequently, the panel was excited by scanning with He—Ne laser light (633 nm), and photostimulated luminescence emitted from the photostimulable phosphor layer was accepted by a photo accepting machine (photo-multiplier tube with spectral sensitivity of S-5) in 36 points of measurement which line at equal intervals on the radiographic image conversion panel to measure the intensity thereof. Uneven luminance was evaluated from variation of the intensity in respective points of measurement. The uneven luminance is one where a width of the maximum and minimum values of the luminance in each point of measurement in each panel is divided by an average value of the intensities in 25 points of measurement and this is represented by %.

As described above, and as is obvious from the results in Table 1, in the radiographic image conversion panels (Examples 1 to 4) laminated such that directions directed by respective carbon fibers in a plurality of carbon fiber reinforced plastic sheets are arranged at intervals with equal angle, all warp amounts of the panels are 0.4 mm or less which are small, the uneven images are 7% or less, the warp of the panel can be remarkably reduced compared to the comparative Examples 1 and 2, and image quality can be further improved.

TABLE 1

| | DIRECTIONAL PERCENTAGE | | | | | | WARP OF PANEL | UNEVEN IMAGE |
|---|---|---|---|---|---|---|---|---|
| | 0° | 90° | 45° | −45° | ±30° | ±60° | mm | Std. |
| EXAMPLE 1 | 50% | 50% | — | | | | 0.4 | 7% |
| EXAMPLE 2 | 25% | 25% | 25% | 25% | | | 0.3 | 5% |
| EXAMPLE 3 | 10% | 10% | — | — | 20% | 20% | 0.2 | 4% |
| EXAMPLE 4 | 20% | 20% | — | — | 15% | 15% | 0.1 | 3% |
| COMPARATIVE EXAMPLE 1 | 100% | — | — | | | | 4.5 | 33% |
| COMPARATIVE EXAMPLE 2 | — | — | 100% | — | | | 4.2 | 28% |

Particularly, as shown in the Examples 3 and 4, in the radiographic image conversion panels having the support laminated such that the carbon fibers are directed in the plurality of directions, it is shown that the warp of the panels and uneven images can be more remarkably reduced.

B (Production of Supports)

First, the supports of the Examples 5 to 11 and the comparative Examples 3 to 6, as shown below, were produced. For the directions of carbon fibers referred to below, the direction (i.e., the direction of slit) orthogonal to the transfer direction in which the support is transferred in a vapor deposition apparatus 21 shown in FIG. 5 described above is rendered 0°.

Example 5

A plurality of carbon fiber reinforced plastic sheets with a film thickness of 200 μm were laminated, heated at 130° C. and pressed with pressure of 100N/cm$^2$ to obtain the support. Here, the sheets were laminated such that the direction of the carbon fibers in 70% carbon fiber reinforced plastic sheets was 0° and the direction of the carbon fibers in 30% carbon fiber reinforced plastic sheets was 90°, in all of the carbon fiber reinforced plastic sheets (see FIG. 6).

Example 6

The support was produced by the same methods as those in the Example 5, except that the sheets were laminated such that the direction of the carbon fibers in 30% carbon fiber reinforced plastic sheets was 0° and the direction of the carbon fibers in 70% carbon fiber reinforced plastic sheets was 90°, in all of the carbon fiber reinforced plastic sheets.

Example 7

The support was produced by the same methods as those in the Example 5, except that the sheets were laminated such that the direction of the carbon fibers in 40% carbon fiber reinforced plastic sheets was 0° and the direction of the carbon fibers in 60% carbon fiber reinforced plastic sheets was 45°, in all of the carbon fiber reinforced plastic sheets (see FIG. 6).

Example 8

The support was produced by the same methods as those in the Example 5, except that the sheets were laminated such that the direction of the carbon fibers in 60% carbon fiber reinforced plastic sheets was 0° and the direction of the carbon fibers in 40% carbon fiber reinforced plastic sheets was 45°, in all of the carbon fiber reinforced plastic sheets.

Example 9

The support was produced by the same methods as those in the Example 5, except that the sheets were laminated such that the direction of the carbon fibers in 65% carbon fiber reinforced plastic sheets was 0°, the direction of the carbon fibers in 25% carbon fiber reinforced plastic sheets was 90° and the direction of the carbon fibers in 10% carbon fiber reinforced plastic sheets was 45°, in all of the carbon fiber reinforced plastic sheets.

Example 10

The support was produced by the same methods as those in the Example 5, except that the sheets were laminated such that the direction of the carbon fibers in 70% carbon fiber reinforced plastic sheets was 0°, the direction of the carbon fibers in 10% carbon fiber reinforced plastic sheets was 90°, the direction of the carbon fibers in 10% carbon fiber reinforced plastic sheets was 45° and the direction of the carbon fibers in 10% carbon fiber reinforced plastic sheets was 30°, in all of the carbon fiber reinforced plastic sheets.

Example 11

The support was produced by the same methods as those in the Example 5, except that the sheets were laminated such that the direction of the carbon fibers in 80% carbon fiber reinforced plastic sheets was 0° and the direction of the carbon fibers in 20% carbon fiber reinforced plastic sheets was 90°, in all of the carbon fiber reinforced plastic sheets.

Comparative Example 3

The support was produced by the same methods as those in the Example 5, except that the sheets were laminated such that the direction of the carbon fibers in 50% carbon fiber reinforced plastic sheets was 0° and the direction of the carbon fibers in 50% carbon fiber reinforced plastic sheets was 90°, in all of the carbon fiber reinforced plastic sheets (see FIG. 6).

Comparative Example 4

The support was produced by the same method as that in the Example 5, except that the sheets were laminated such that the direction of the carbon fibers in 45% carbon fiber reinforced plastic sheets was 0°, the direction of the carbon fibers in 35% carbon fiber reinforced plastic sheets was 90° and the direction of the carbon fibers in 20% carbon fiber reinforced plastic sheets was 45°, in all of the carbon fiber reinforced plastic sheets (see FIG. 6).

Comparative Example 5

The support was produced by the same methods as those in the Example 5, except that the sheets were laminated such that the directions of carbon fibers in all of the carbon fiber reinforced plastic sheets are 0°.

Comparative Example 6

The support was produced by the same methods as those in the Example 5, except that the sheets were laminated such that the directions of carbon fibers, in all of the carbon fiber reinforced plastic sheets are 90°.

(Production of Radiographic Image Conversion Panel)

A photostimulable phosphor (CsBr: 0.001 Eu) was vapor-deposited on a face of the support produced in this way using a vapor deposition apparatus 21 shown in FIG. 5 to form a photostimulable phosphor layer.

First, the above phosphor basic ingredient was filled as a vapor deposition material in a resistance heating crucible, and the support 11 was placed on the support holder 24. At that time, the support 11 was disposed such that the direction of a slit 26 corresponded to the direction of carbon fibers which were directed at 0° in the carbon fiber reinforced plastic sheets. Also, one made from aluminium was used as a deposition preventing plate 27, and a distance between the support 11 and the evaporation source 23 was 60 cm.

Subsequently, an air inside the vapor deposition apparatus 21 was once discharged, N2 gas was introduced to adjust a vacuum degree at 0.1 Pa, and then the temperature of the support 11 was retained at 200° C. with transferring the support in a horizontal direction against the evaporation source 23.

Next, the resistance heating crucible was heated to vapor-deposit the photostimulable phosphor, and the vapor deposition was terminated when a film thickness of the photostimulable phosphor layer became 500 μm.

Then, a protection layer having borosilicate glass was overlaid on the photostimulable phosphor layer in dried air, and peripheries of the support 11 and the protection layer were enclosed by an adhesive to obtain a radiographic image conversion panel with a structure where the photostimulable phosphor layer is sealed.

For the obtained radiographic image conversion panels, the warp of panels and the uneven images (uneven luminance) were evaluated, similarly to the above-described way, and the results are shown in Table 2.

As described above and as obvious from the results in Table 2, in the radiographic image conversion panels (Examples 5 to 11) each of which comprise the support laminated such that 60% or more carbon fibers in the carbon fibers in all the carbon fiber reinforced plastic sheets are directed to the same direction, every warp amount of the panels is 0.7 mm or less, the uneven images are 10% or less, the warp of the panel can be remarkably reduced compared to the comparative Examples 3 to 6, and image quality can be further improved.

TABLE 2

| | DIRECTIONAL PERCENTAGE | | | | WARP OF PANEL | UNEVEN IMAGE |
|---|---|---|---|---|---|---|
| | 0° | 90° | 45° | ±30° | mm | Std. |
| EXAMPLE 5 | 70% | 30% | — | — | 0.1 | 4% |
| EXAMPLE 6 | 30% | 70% | — | — | 0.4 | 6% |
| EXAMPLE 7 | 40% | — | 60% | — | 0.7 | 10% |
| EXAMPLE 8 | 60% | — | 40% | — | 0.5 | 7% |
| EXAMPLE 9 | 65% | 25% | 10% | — | 0.7 | 9% |
| EXAMPLE 10 | 70% | 10% | 10% | 10% | 0.2 | 3% |
| EXAMPLE 11 | 80% | 20% | — | — | 0.4 | 5% |
| COMPARATIVE EXAMPLE 3 | 50% | 50% | — | — | 2.6 | 21% |
| COMPARATIVE EXAMPLE 4 | 45% | 35% | 20% | — | 3.1 | 28% |
| COMPARATIVE EXAMPLE 5 | 100% | — | — | — | 3.0 | 25% |
| COMPARATIVE EXAMPLE 6 | — | 100% | — | — | 6.3 | 48% |

Particularly, as is shown in the Examples 5, 8, 10 and 11, in the radiographic image conversion panels having the support laminated such that the direction of 60% or more carbon fibers is 0° (direction orthogonal to the transfer direction of the support), it is shown that the warp of panels and the uneven images have been remarkably reduced.

As described above, the examples of the invention were described, but it goes without saying that the invention is not limited to such examples and various modifications are possible within the scope without departing from the gist of the invention.

According to the invention, since the support is laminated such that the directions directed by respective carbon fibers in the plurality of carbon fiber reinforced plastic sheets are arranged at approximately equal angles, the surface of the support becomes the even face, and thus it is possible to reduce warp of panels and the uneven images. Further, since the photostimulable phosphor is vapor-deposited by rotating such a support, the residual stress left at the vapor deposition is dispersed, and thus in this respect, it is also possible to reduce the warp of panels and the uneven images.

Additionally, according to the invention, since the support is laminated such that 60% or more carbon fibers in the carbon fibers in all of the carbon fiber reinforced plastic sheets are directed to the same direction, the residual stress left at the vapor deposition and the direction to which the support is warped become orthogonal to each other. Therefore, these stresses are offset to each other, and thus it is possible to reduce warp of the panel which comprises the support and the photostimulable phosphor layer and also further reduce the uneven images.

All disclosures of Japanese Patent Application Nos. 2002-381389 and 2002-381555, which were filed on Dec. 27, 2002 including the specification, claims, drawings and abstract are herein incorporated in their entirety.

What is claimed is:

1. A radiographic image conversion panel comprising, a support and a photostimulable phosphor layer formed on the support by a vapor deposition method,
wherein the support comprises a plurality of carbon fiber reinforced resin sheets each of which includes carbon fibers arranged in a direction and impregnated with a heat resistant resin such that directions of the carbon fibers in the carbon fiber reinforced resin sheets are different from each other and arranged at approximately equal angles.

2. The conversion panel of claim 1; wherein at least a layer of the photostimulable phosphor layers contains a photostimulable phosphor which comprises an alkali halide as a host and is represented by the following general formula (1), $$M^1X.aM^2X'_2.bM^3X''_3:eA \qquad (1)$$

where $M^1$ is at least one alkali metal atom selected from respective atoms of Li, Na, K, Rb and Cs; $M^2$ is at least one bivalent metal atom selected from respective atoms of Be, Mg, Ca, Sr, Ba, Zn, Cd, Cu and Ni; $M^3$ is at least one trivalent metal atom selected from respective atoms of Sc, Y, La, Ce, Pr, Nd, Pm, Sm, Eu, Gd, Tb, Dy, Ho, Er, Tm, Yb, Lu, Al, Ga and In; X, X' and X" are at least one halogen atom selected from respective atoms of F, Cl, Br and I; "A" is at least one metal atom selected from respective atoms of Eu, Tb, In, Ce, Tm, Dy, Pr, Ho, Nd, Yb, Er, Gd, Lu, Sm, Y, Tl, Na, Ag, Cu and Mg; and "a", "b" and "e" represent values in ranges of $0 \leq a < 0.5$, $0 \leq b < 0.5$ and $0 < e \leq 0.2$, respectively.

3. A radiographic image conversion panel comprising, a support and a photostimulable phosphor layer formed on the support by a vapor deposition method,
wherein the support comprises a plurality of carbon fiber reinforced resin sheets each of which includes carbon fibers arranged in a direction and impregnated with a heat resistant resin such that directions of the carbon fibers in the carbon fiber reinforced resin sheets are different from each other, and 60% or more carbon fibers in all of the carbon fiber reinforced resin sheets are arranged at approximately the same direction.

4. The conversion panel of claim 3; wherein the support comprises a plurality of carbon fiber reinforced resin sheets each of which includes carbon fibers arranged in two directions different from each other and 60% or more carbon fibers are directed to one of the different two directions.

5. The conversion panel of claim 3; wherein at least a layer of the photostimulable phosphor layers contains a photostimulable phosphor which comprises an alkali halide as a host and is represented by the following general formula (1), $$M^1X \cdot aM^2X'_2 \cdot bM^3X''_3 : eA \tag{1}$$

where $M^1$ is at least one alkali metal atom selected from respective atoms of Li, Na, K, Rb and Cs; $M^2$ is at least one bivalent metal atom selected from respective atoms of Be, Mg, Ca, Sr, Ba, Zn, Cd, Cu and Ni; $M^3$ is at least one trivalent metal atom selected from respective atoms of Sc, Y, La, Ce, Pr, Nd, Pm, Sm, Eu, Gd, Tb, Dy, Ho, Er, Tm, Yb, Lu, Al, Ga and In; X, X' and X" are at least one halogen atom selected from respective atoms of F, Cl, Br and I; "A" is at least one metal atom selected from respective atoms of Eu, Tb, In, Ce, Tm, Dy, Pr, Ho, Nd, Yb, Er, Gd, Lu, Sm, Y, Tl, Na, Ag, Cu and Mg; and "a", "b" and "e" represent values in ranges of $0 \leq a < 0.5$, $0 \leq b < 0.5$ and $0 < e \leq 0.2$, respectively.

* * * * *